March 13, 1934.  J. P. MARTIN  1,950,504
PERFORATING MACHINE
Filed Jan. 15, 1932   5 Sheets-Sheet 1

INVENTOR
John P. Martin
BY
ATTORNEY

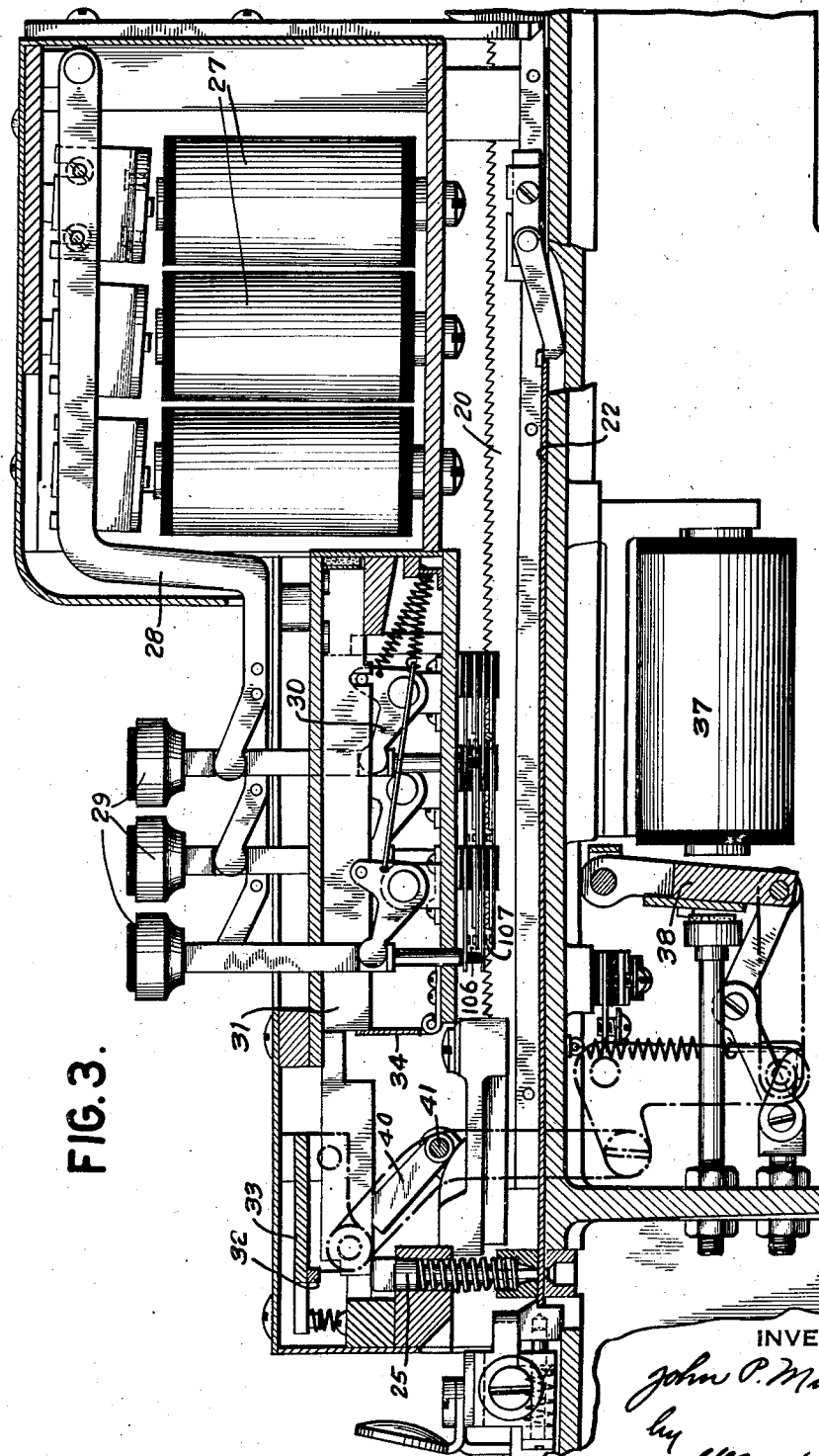

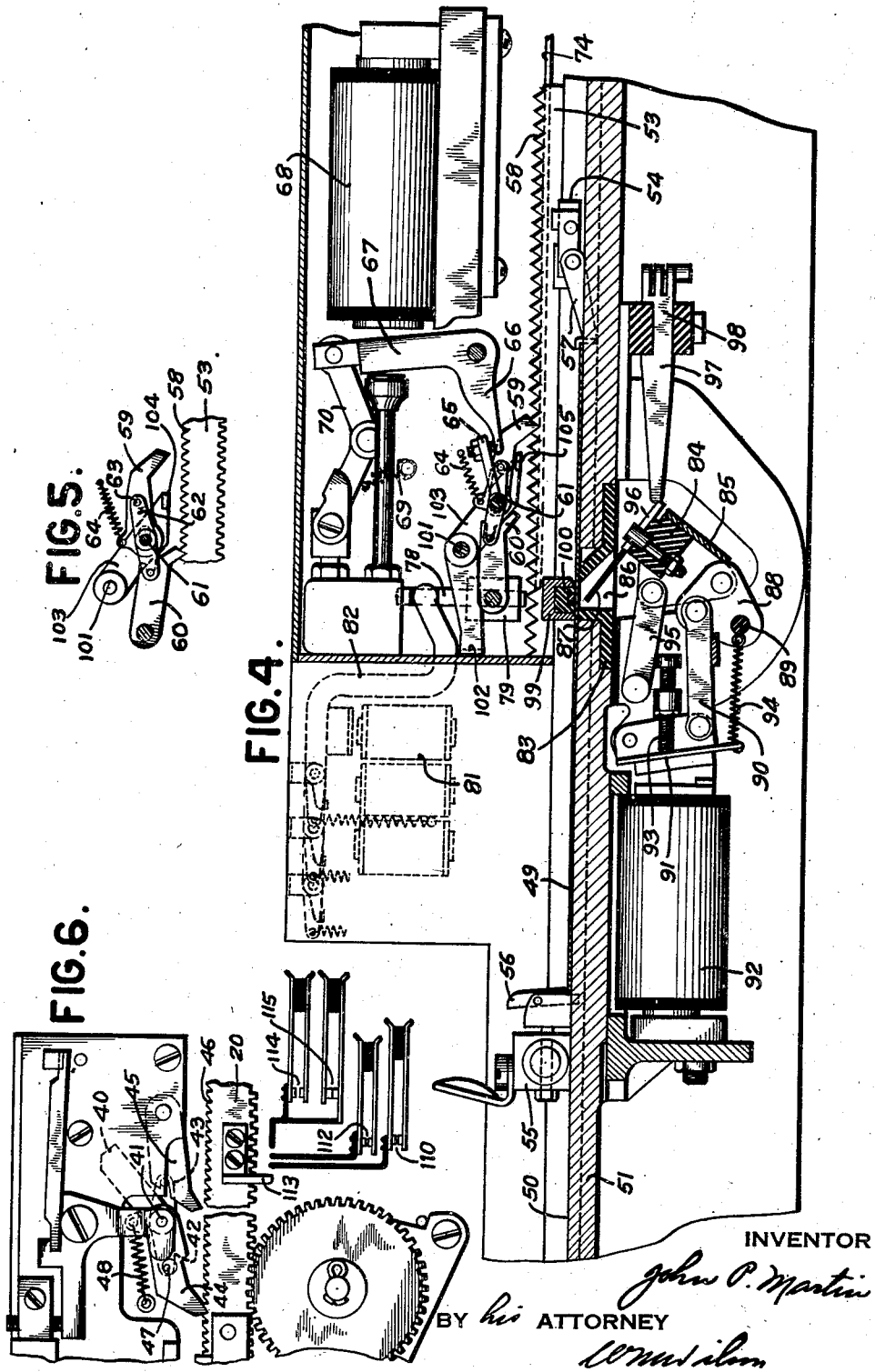

March 13, 1934.   J. P. MARTIN   1,950,504
PERFORATING MACHINE
Filed Jan. 15, 1932   5 Sheets-Sheet 4
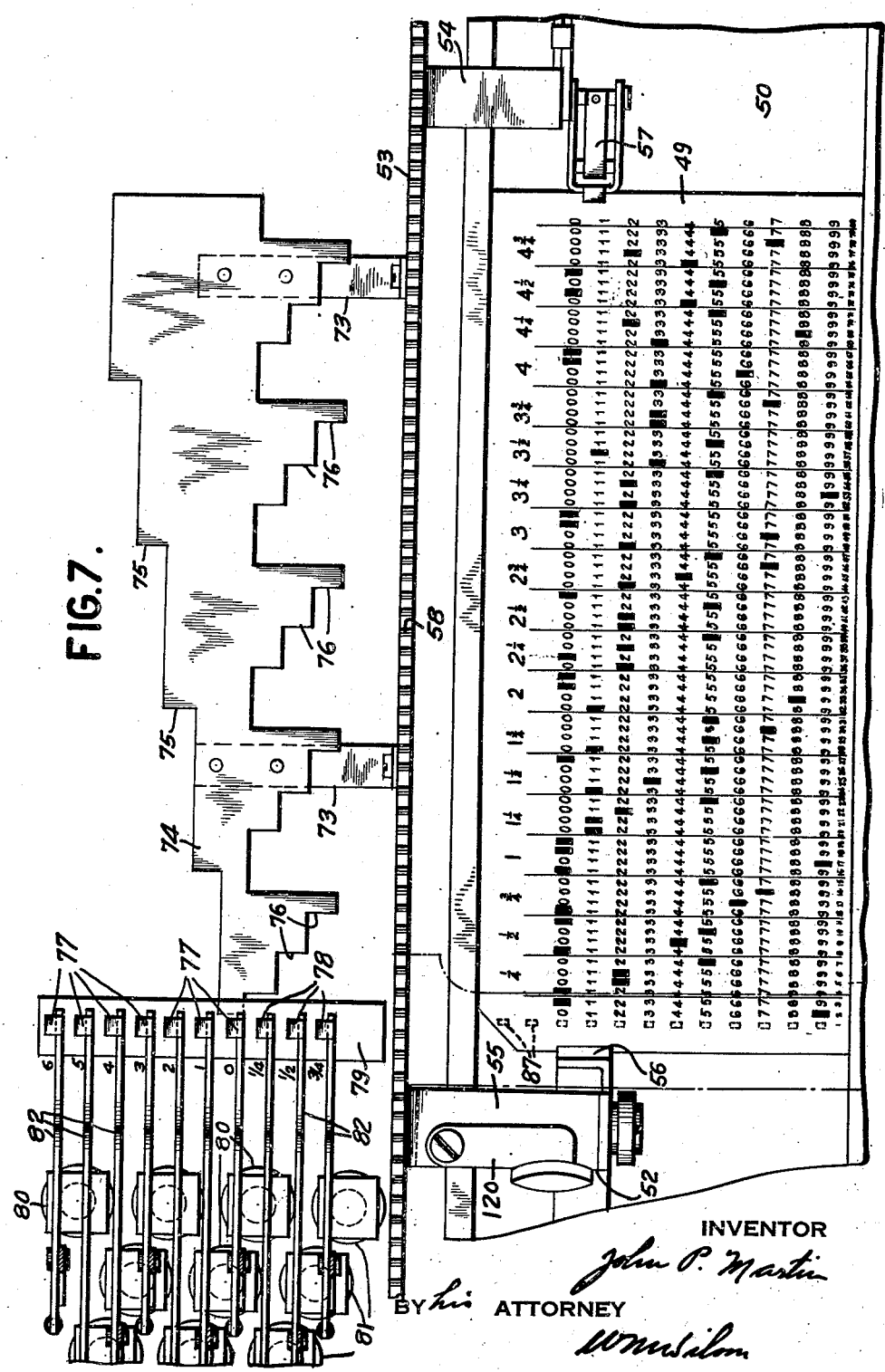

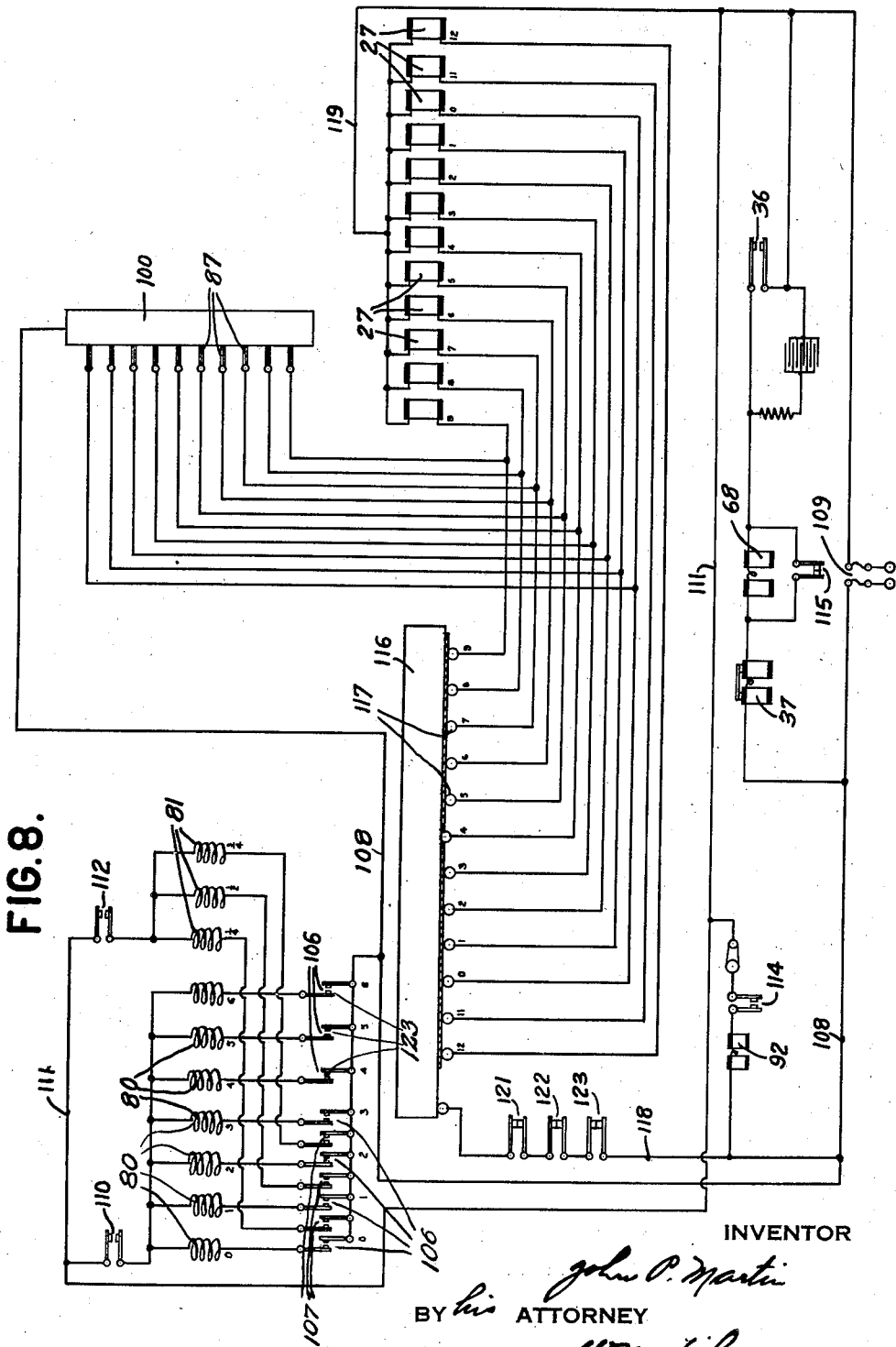

Patented Mar. 13, 1934

1,950,504

UNITED STATES PATENT OFFICE 1,950,504

PERFORATING MACHINE

John P. Martin, Washington, D. C., assignor, by mesne assignments, to International Business Machines Corporation, New York, N. Y., a corporation of New York Application January 15, 1932, Serial No. 586,905

21 Claims. (Cl. 164—115)

The present invention relates to accounting machines in general and particularly to machines wherein the various accounting operations are performed under control of perforated records. The invention will be described hereinafter as arranged for control by perforated cards like those used in the well known Hollerith system for compiling accounting and statistical data.

The primary object of the invention hereinafter to be described is to provide a novel accounting machine capable of performing certain operations not heretofore possible in machines like the one selected for illustrating the invention.

A broad object of the invention is to provide a novel record perforating machine capable of automatically perforating a blank record in accordance with predetermined data designations set-up on a suitable machine control device, such data being automatically selected under control of data designations on another coordinated machine control device, the data on both devices being entered in the blank card in accordance with the joint control of both control devices.

A more specific object is to generally improve machines of the type known in the art as "duplicating machines" by making them more flexible in their operation and extending the scope of their usefulness.

Another object is to provide a record duplicating machine which is capable of reproducing in a blank record certain predetermined data from a controlling element or device such as another record, the data to be reproduced from said device being first selected by suitable devices and then becoming effective to automatically enter the desired data in the blank record.

A further object is to coordinate with an electric duplicating machine of known construction an auxiliary control device capable of controlling the machine in accordance with prearranged data designations on a control element adapted to be read by said device and under selective control by suitable devices controlled by data designations in a master record read by the duplicating machine whereby to automatically enter in the blank record predetermined data supplementing the data reproduced under direct control of the master record.

A specific object is to provide mechanism for automatically controlling a duplicating machine by means of tabular data in a suitable control element which data may be selected by suitable devices incorporated in the machine and controlled manually or by a master record.

Various other objects, advantages or features of the invention will be pointed out in the following description and claims or will be obvious after a study thereof and of the accompanying drawings which disclose a purely illustrative embodiment of the invention.

Fig. 3 is a vertical longitudinal section taken substantially on the line 3—3 in Fig. 1 and illustrates the general details of construction of the perforating mechanism;

Fig. 4 is a vertical longitudinal section taken substantially on the line 4—4 in Fig. 1;

Fig. 5 is an elevation of the escapement mechanism for the carriage for feeding the control element and shows certain of the parts in operated position;

Fig. 6 is a rear view in elevation of the escapement mechanism for the card carriage of the perforating mechanism and illustrates certain contacts for controlling the machine;

Fig. 7 is a top plan view of certain parts which effect the selective positioning of the carriage for the control element some of the parts having been omitted for sake of clearness;

Fig. 8 is a diagram of the electrical connections of the machine.

The present invention, solely for convenience in description, will be illustrated as embodied in a duplicating machine similar to that illustrated in Letters Patent No. 1,772,186, granted to Lee and Phillips, however, it will be understood that it is not limited in its application to such a machine as it may be embodied in other machines equally as well. Since the duplicating machine illustrated in said patent has become well known in the art it will not be described in detail but only a general description will be given such as will clearly show how the invention may be embodied in said machine.

Figure 1:
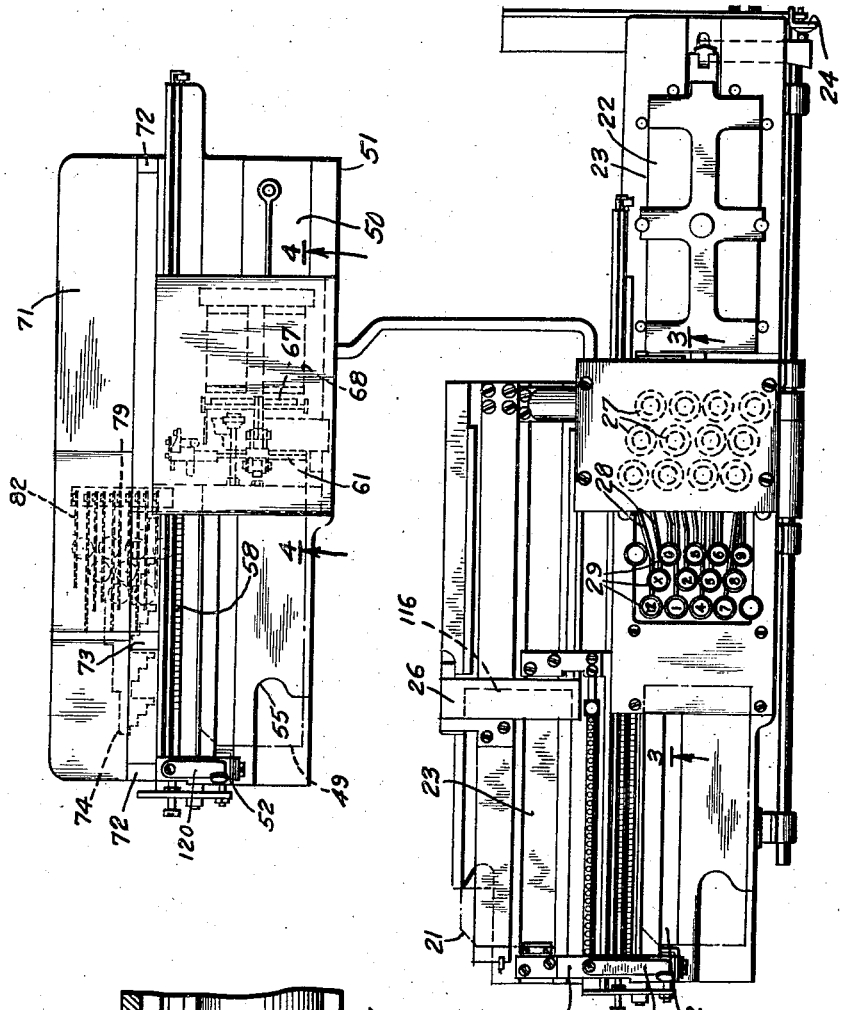
Fig. 1 is a top plan view of a machine embodying this invention.

The lower half of Fig. 1 illustrates a top plan view of a machine similar to that disclosed in the patent previously mentioned which includes a carriage 20 mounted for slidable movement longitudinally of the machine and adapted to feed a master card 21 and a blank card 22 in spaced relation from right to left in said figure under the influence of suitable escapement mechanism illustrated in Fig. 6. The master card 21 may be the well known card used in the Hollerith system for compiling accounting or statistical data wherein the card is divided into a plurality of fields, each field comprising at least one column extending transversely to the longitudinal axis of the card and adapted to receive one or more data designating perforations, each column being divided into twelve index-point positions having values assigned thereto ranging from 0 to 12, inclusive.

The machine may be operated in one of two ways. When automatic operation is desired, a master card 21 is placed on a card table 23 (Fig. 1) and thereafter a feed lever 24 is grasped and moved to the left Fig. 1. This operation causes a blank card 22 to be fed from a magazine 23 at the right end of the machine and at the same time causes the carriage 20 to be drawn to the right to a position to permit suitable gripping devices in the carriage to engage the blank card fed from the magazine. As soon as the feed lever 24 is released, the carriage will be left in its extreme right hand position in which position a column of punches 25 (Fig. 3) will overlie the first column of the blank card in readiness for perforating in said column.

When the carriage occupies its extreme right hand position one or more of a set of reading devices mounted beneath a housing 26 will cooperate with any holes which may appear in the first column of the master card 21 and consequently an impulse of current will be sent through one or more of a series of punch selecting magnets 27 (Fig. 3). Each punch magnet 27 coacts with an armature on a rock lever 28 (Fig. 3) which has a pivotal connection to the key 29 associated with the index-point position in which the perforation occurs. Consequently, energization of a magnet 27 will result in depressing one of the keys 29, which operation will cause a bell crank 30 having a pivotal connection to the key stem to be rocked thereby moving a punch interposer 31 to the left (Fig. 3). This operation will cause the left end of the operated interposer 31 to come between a rib 32 in the punch operating plate 33 and the upper end of the desired punch 25.

Figure 2:
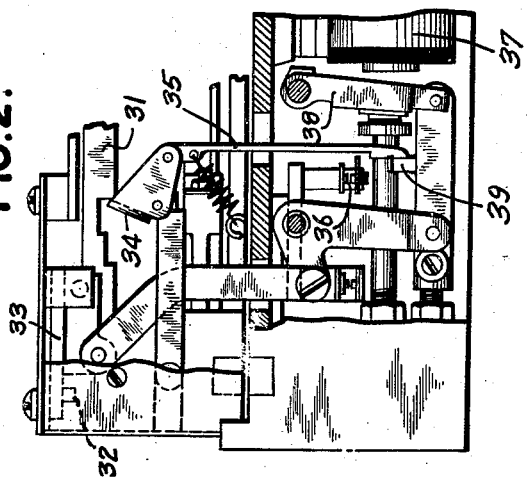
Fig. 2 is an enlarged detail view showing the mechanism for operating certain contacts in the perforating mechanism.

Movement of an interposer 31 to the left also rocks a pivoted plate 34 counterclockwise (Figs. 2 and 3) thereby drawing up a hook 35 which effects closure of a pair of contacts 36 mounted upon and insulated from a fixed part of the machine, closure of the contacts 36 taking place at the time when the interposer 31 reaches the end of its stroke to the left. Closure of contacts 36 causes the punch operating magnet 37 to be energized thereby drawing the armature 38 of said magnet to the right (Figs. 2 and 3) and, through a system of links and a bell crank, the punch operating plate 33 will be drawn downwardly thereby forcing the selected punch through the blank card 22 at the appropriate index point position.

When the armature 38 nears the end of its movement towards the pole of the magnet 37, an element 39 fast to one of the links connected to the armature 37 carries the hook 35 from an engagement with one of the contact members of contacts 36 and causes said contacts to open thereby deenergizing the punch operating magnet 37 and permitting it to release its armature and also permitting restoration of the operated interposer 31.

The operation of magnet 37 as described also causes escaping of the carriage 20 to effect a feeding movement of one column space to the left in Fig. 1 which feeding movement is effected by operation of a bail 40 underlying the left ends (Fig. 3) of all the interposers 31. The ball 40 is mounted on a shaft 41 which is journalled in the framework and carries at its rear end suitable arms 42, 43 having a pivotal connection to escapement dogs 44, 45 respectively (see Fig. 6).

When the shaft 41 is rocked counterclockwise (Fig. 3) or clockwise (Fig. 6) by depression of the left end of a selected interposer 31, the dog 44, which is normally in engagement with rack teeth 46 in carriage 20, will be raised out of engagement with said teeth while the dog 45 will be lowered into engagement with the rack 46 thus preventing movement of the rack for the time being, the parts being held in this position until the magnet 37 is released. The dogs 44, 45 are so timed that dog 45 engages the teeth of rack 46 before the dog 44 can clear said teeth.

The dog 44 is loosely mounted on shaft 41 which extends through a slot in said dog and the arm 42 operating dog 44 has a pin 47 projecting into a hole in said dog larger than said pin. A spring 48, interposed between a fixed part of the frame and a vertically extending tail formed in the dog 44, normally tends to draw said dog to the left (Fig. 6) but is insufficient in power to do so because the carriage feeding spring is of superior tension. When the dog 44 clears the rack, the spring 48 will immediately draw said dog to the left (Fig. 6) so that the end of the dog will overlie the next adjacent tooth space, consequently, when the magnet 37 releases its armature 38 the dog 44 will be lowered and will slip into said tooth space just before the dog 45 clears the teeth 46 so that the carriage 20 will be released and will move one column space to the left (Fig. 3) or to the right (Fig. 6) until it is arrested by dog 44 in readiness for another punching operation.

In order to operate the machine manually it is merely necessary to press the appropriate keys 29 in succession. These operations will cause interposers 31 to be moved forward exactly as if the magnets 27 had been energized and will cause perforations to be made in the card columns in correspondence to the index point values of the keys depressed.

The mechanism for automatically controlling the punches 25 in accordance with data in a control element such as another record card will now be described. The upper half of Fig. 1 illustrates the unit which automatically controls perforating operations and comprises mechanism for selectively feeding a control element 49 which may consist of a pre-punched record card, which record card is illustrated in Fig. 7.

Before proceeding with the description of the mechanism the arrangement of the record card will be explained with reference to a specific illustration which it will be understood has been selected purely for purposes of explanation.

In cost accounting systems it is usually desired to secure at least two different tabulations. One tabulation consists in a classified record of labor cost for individual jobs or machine operations, the labor cost of each job or operation being determined by first sorting out a batch of records so that individual items of the labor cost of the same job or operation are together and then preparing a printed schedule which shows the total labor cost of each job or operation. The other tabulation desired is for payroll purposes wherein the records are preliminarily arranged according to the employee's number so that the total wage due each employee will be indicated on the printed schedule. Records arranged as described are usually tabulated by clerks using well known forms of adding or computing machines.

A given employee during the course of the payroll period often has a large number of jobs or machine operations to perform, each of which has a different job number or operation number, and the cost of which must be ascertained separately, and at the same time it is also necessary to total up the various items to determine the amount to be paid to the employee. In the perforated card art these operations are very readily as well as economically accomplished by providing a card for each individual job or operation and recording on said card by means of perforations the data as to the time spent by the employee on that particular job. Afterwards the cards may be gathered together, sorted according to job number, and then run through a tabulating machine to secure a printed schedule showing the labor cost for each separate job.

The cards may also be sorted according to employee's number and run through the tabulating machine to secure a payroll schedule which shows the amount to be paid each employee.

Workmen are frequently paid on the basis of the time spent on each job according to an hourly rate, hence it will be seen that the labor involved in compiling the cost records may be considerable where employees work on a large number of small jobs during the payroll period so that there may be a large number of cards for each job and employee. According to the ordinary procedure the employee, when he finishes a job, makes out a suitable slip or an entry on his time card indicating the time spent on the job as well as the job number and other data. In some instances a new time card is issued for each job showing the time in which it was commenced and finished as well as the job number and other data necessary for the records. As has been said, it is a laborsome process to compute the money value of the employee's time and usually requires a large staff of clerks engaged solely in that work since it is necessary to multiply the employee's time by his rate in order to secure the labor cost of a particular job. Ordinarily this would all be done by means of well known expensive and intricate calculating machines and would require that two separate machines be used, the calculating machine being necessary to compute the labor cost and a perforating machine being necessary to perforate the record cards with the desired data.

According to the present invention, a machine is provided which eliminates the necessity of using a calculating machine for computing the labor cost of each individual job and provides means for automatically perforating the labor cost in the appropriate columns of the record card along with other data, this automatic perforating of the card being initiated by automatic selecting devices controlled by the operation of perforating the employee's time in the card so that it is merely necessary for the operator to perforate the employee's time in the record card and thereafter the machine automatically perforates the labor cost in accordance with control by a special rate card which is preperforated to form a rate schedule.

It will be noted by reference to Fig. 7 that the control element 49 for automatically perforating the labor cost in the blank card 22 comprises a record card of well known arrangements and is divided into a plurality of fields of four columns each, these fields being headed with numerals ranging from ¼ to 4¾ by quarters. These numerals indicate the elapsed time in terms of hours and quarter hours. The three columns on the left of the card are devoted to perforating the rate which in the specimen card 49 is taken as 90 cents per hour. In the column headed "¼" is perforated the product of 90 cents and the fraction ¼ or 22½ cents. Similarly, in the column headed "½" is perforated the product of 90 cents and ½ or 45 cents. Likewise, the remaining fields are perforated with the product of the time indicated at the head of each field and the rate 90 cents so that the control element 49, in effect, represents a schedule of labor values at 90 cents an hour for periods of time ranging from ¼ of an hour to 4¾ hours by quarter hours.

It will be obvious that any one of the fields in the control element 49 might be used to control perforating of the blank card 22 by providing suitable selecting devices for determining the field in card 49 which is to control perforating of the card 22 and thereafter causing the card 49 to be fed step-by-step to permit reading devices to read perforations in the field selected. Preferably the selecting of the fields in which perforations are to be read is accomplished either through the keys 29 or through data designations in the master card 21, the data, of course, being the time which an individual employee spent in a particular operation or job.

For the purpose of selecting the desired field, the card 49 is adapted to be fed lengthwise of a card feeding table 50 formed in the upper surface of the base 51 of the control unit shown in the upper half of Fig. 1. The card 49 is fed by a carriage 52 similar in construction with the carriage 20 for feeding the card 22. The carriage 52 comprises a rack 53 having forwardly extending arms 54, 55 carrying suitable gripping devices 56, 57 which hold the card flat and in contact with the table 50. The rack 53 is provided with suitable teeth 58 with which cooperates escapement mechanism similar to the escapement mechanism for the carriage 20, which escapement mechanism is partially illustrated in Fig. 5.

The escapement mechanism comprises a dog 59 normally in engagement with the teeth 58 so as to prevent movement of the rack 53 to the left (Figs. 4 and 7) under the influence of a suitable carriage feeding spring (not shown) and of well-known construction and includes a dog 60 normally out of engagement with said teeth 58.

The dog 59 is pivotally mounted on a shaft 61 which shaft has fixed thereto a lever 62 having a pin and slot connection at one end to the dog 60 and at the other end a pin 63 extending into a hole in the dog 59 somewhat larger than the pin 63 so as to permit a certain amount of lost motion between the dog 59 and pin 63. A spring 64 normally tends to draw the dog 59 to the right (Figs. 4 and 5). The dog 59 is slotted where it is mounted on the shaft 61 in order to permit said dog to be drawn slightly to the right (Fig. 5) under the influence of spring 64 but normally when said dog is engaging the teeth of rack 58, the superior force of the carriage feeding spring (not shown) keeps the spring 64 tensioned with the shaft 61 in the right portion of the slot in the dog 59, the normal position of the parts being indicated in Fig. 4.

Fixed to the shaft 61 is an arm 65 having an adjusting screw which overlies an arm 66 extending from a pivoted armature 67 associated with a magnet 68. It will be obvious that when the magnet 68 is energized the armature 67 will be drawn towards the pole of the magnet and will cause the arm 66 to be raised thereby rocking arm 65 and shaft 61 in a counterclockwise direction (Figs. 4 and 5) which operation will cause the dog 59 to become disengaged from the rack teeth 58 shortly after the nose in dog 60 engages one of the teeth 58 so that for the time being no movement of the rack 53 will take place. As soon as the magnet 68 becomes deenergized, a spring 69 acting upon a toggle 70 interposed between the end of the armature 67 and the fixed part of the machine will cause said armature to become retracted thereby permitting the shaft 61 to rock clockwise back to its former position.

When the dog 59 is disengaged from the rack 58, the spring 64 immediately draws said dog 59 slightly to the right to the position shown in Fig. 5 in which position the end of the dog overlies the next adjacent tooth space to the right of the one in which it formerly rested.

As soon as the magnet 68 becomes deenergized, as described, and the shaft 61 is rocked back to its normal position partly through the influence of spring 64, the dog 59 will slip into the tooth space which it overlies before the dog 60 clears the teeth 58 and, on the latter occurring, the rack 53 will be released and will move one tooth space, the dog 59 meanwhile riding down into the teeth and arresting the rack 53 at the end of said movement of one tooth space. This will cause the carriage to move a distance of one column space in control element 49.

The mechanism for selectively operating the carriage 52 to bring any desired field of four columns into position to control the punches 25 comprises mechanism illustrated in detail in the upper half of Fig. 7, which mechanism is contained in a housing 71 (Fig. 1) supported on brackets 72 secured to the rear of the base 51. Extending rearwardly of the rack 53 are two arms 73 to which is secured a stepped selector plate 74 having formed therein two sets of steps 75, 76 which stepped plate 74 is arranged to cooperate with a series of movable stops 77, 78 which are vertically slidable in a frame member 79 secured to the framework of the machine. The stops 77 are designed to cooperate with the steps 75 while the stops 78 similarly cooperate with the steps 76.

Normally the stops 77, 78 are out of the path of movement of the steps 75, 76 but said stops may be moved into the path of said steps through the medium of electromagnets 80, 81 there being only three magnets 81 which operate the three stops 78 through the medium of pivoted levers 82 which have a pivotal connection with corresponding stops 78. Other levers 82 similarly connect the magnets 80 with the stops 77 so that it will be obvious that energization of a magnet 80 or 81 will cause the associated stops 77, 78 to be projected into the path of one of the steps 75, 76, in the stepped plate 74. It will be clear that by selective operation of magnets 80, 81, the stepped plate 74 may be selectively arrested when released for movement to the left (Fig. 7) by mechanism hereinafter to be described.

The steps 75 are so positioned on the stepped plate 74 as to correspond approximately with the dividing line to the left of each field representing the units of hours, while the steps 76 are similarly arranged to come opposite the dividing lines to the fields devoted to fractions of hours; thus there are provided four steps 75 to correspond with the units of hours 1 to 4 and five groups of steps 76 to correspond with the five groups of fractional hours. It will be clear that if the lowest stop 78 (Fig. 7) is moved into the path of the stepped plate 74 and the carriage is thereafter released for movement to the left, the extreme right hand step 76 of the first group on the left will strike said stop and arrest the carriage. On the other hand, if the lowest stop 77 is pushed downwardly, no movement of the plate 74 will take place so that this particular stop may be termed the zero stop. If the next stop 77 or the second one from the bottom is pressed downwardly, the first step 75 to the left (Fig. 7) will strike said stop when the carriage is released for movement. It will be clear from the foregoing that it will be possible to selectively set the carriage 53 by suitably operating the stops 77, 78 in combination.

Reading devices are provided for reading the perforations in any desired field of the control element 49 after the carriage has been selectively set to the desired field by suitable operation of stops 77, 78. The reading devices comprise a series of ten reading brushes 87 mounted in an insulating block 84 carried by a bail 85 and are adapted to move vertically in slots 86 formed in an insulating plate 83 mounted in an opening in the table 50. The bail 85 is pivotally mounted in plates 88 journalled on a shaft 89 carried by the frame work. The plates 88 have a pivotal connection to a pair of integrally joined links 90, the left ends of which (Fig. 4) are pivoted to the armature 91 of an electromagnet 92, said armature 91 being held against an adjustable stop 93 by means of a spring 94. In order to guide the bail 85 in its movements and hold it with the brushes in the position shown in Fig. 4 there is provided a pair of links 95 pivoted at each end of said bail and to a fixed part of the frame. Each brush 87 has a shank 96 against which bears a wiping contact 97 carried by an insulating block 98 fixed to the underside of the table 50. Overlying the brushes 87 is a contact bridge 99 having a bar of insulating material which supports a contact bar 100 adapted to cooperate with the brushes 87. As shown in Fig. 4 the bridge 99 is spaced slightly from the table 50 so as to permit the control element 49 to move freely between the brushes 87 and the contact bar 100.

When the magnet 92 is energized, the armature 91 will be drawn to the left (Fig. 4) thereby rocking the plates 88 counterclockwise to raise the bail 85, which operation will cause the ends of the brushes 87 to be pressed upwardly against the underside of the control element 49, the links 95 causing the ends of the brushes 87 to move vertically in substantially a straight line without, however, breaking the connection between the shanks 96 of said brushes and the wiping contacts 97.

It will be seen that by operation of the stops 77, 78 the carriage 52 may be moved to the left selectively and bring the first column of one of the fields of control element 49 into register with the brushes 87 and thereafter step-by-step actuation of the carriage will cause the brushes 87 to read successively the perforations occurring in the four columns of the selected field and such movement may be used to control the punches 25 accordingly. The manner in which the carriage 52 is released to cause such movement of the carriage will now be described.

Secured to a shaft 101 journalled in the framework is a bail 102 which extends to the left (Fig. 4) and underlies all of the arms 82 which operate the stops 77, 78 and also secured to shaft 101 is an arm 103 which extends to the right (Fig. 5) and has an offset lug 104 underlying the dog 59. It will be obvious that whenever one of the magnets 80, 81 is energized to draw down an arm 82, the bail 102 will be rocked downwardly thereby rocking the arm 103 counterclockwise (Fig. 5) to lift the dog 59 and release the carriage, these operations being so timed that the operated stop 77 or 78 will be projected into the path of one of the steps 75, 76 before the dog 59 has been raised far enough to clear the teeth 58 in the rack.

Since there are more fields in the control element 49 than there are magnets 80, 81, it is necessary, in order to selectively arrest the carriage 52 with the brushes 87 cooperating with the first column of any desired field, that the magnets 80, 81 be operated according to a particular sequence.

The steps 75 are designed to select groups of fields in the card 49 while the steps 76 select individual fields in a group; thus, it will be seen that if it is desired to select the field headed "3½" it will be necessary to first depress the fourth stop 77 from the bottom (Fig. 7) and cause the carriage to move to the left until the step 75 corresponding to the dividing line between the first column of the field headed "3" and the last column of the field headed "2¾" arrests the carriage. Thereafter it will be necessary to operate the second stop 78 from the bottom to cause the carriage to move a further distance to the left to bring the brushes 87 into registration with the first column of the field headed "3½". The manner in which the magnets 80, 81 are selectively energized to cause selective movement of the carriage 52 will now be described.

Associated with each of the keys 29 of the perforating mechanism corresponding to the numerals 0 to 6, inclusive, is a pair of contacts 106 which are closed whenever the associated key is depressed (Fig. 3). An extra pair of contacts 107 is provided for the "1", "2", and "3" keys since these keys are used to control the machine according to both the units 1 to 3 and the fractions ¼ to ¾, respectively. These contacts 106, 107 are connected to the magnets 80, 81 in a fashion illustrated in Fig. 8.

It will be noted that the three magnets 81 are connected to the extra pair of contacts 107 associated with the "1", "2", and "3" keys, respectively, while the magnets 80 are connected in series with the other pairs of contacts 106 associated with the "0" to "6" keys, inclusive, the contacts 106, 107 having a common connection through a wire 108 to the left side of the current supply line 109. The magnets 80 have a common connection through a pair of normally open contacts 110 to the right side of the line 109 over a wire 111. The three magnets 81 have a similar common connection through a pair of normally open contacts 112 to the wire 111.

It will be obvious that whenever the "3" key for instance, is depressed, the contacts 106, 107 associated with said key will be closed and may establish a circuit from left side of line 109, wire 108, to contacts 106, closed by said "3" key, the magnet 80 operating the fourth from the bottom stop 77 (Fig. 7), contacts 110, and line 111, to the other side of the current supply line 109, or the circuit may be established through contacts 107 instead of contacts 106, magnet 81 operating the top stop 78 (Fig. 7), contacts 112, wire 111, to the right side of line 109, provided contacts 112 are closed instead of contacts 110. Likewise, if the "2" key, for instance, be depressed, a circuit may be established through the contacts 106 associated with said key through either the magnet 81 associated with the second stop 78 from the bottom (Fig. 7) or the magnet 80 associated with the third stop 77 from the bottom (Fig. 7), according to whichever of the contacts 110, 112 happen to be closed.

The contacts 110, 112 are operated by a projection 113 mounted on the carriage 20 for the perforating mechanism and positioned to become effective to close first the contacts 110 in perforating the units of hours in the blank card 22 and thereafter to close the contacts 112 when perforating the fractional parts of an hour in the desired columns of the blank card. The projection 113 also becomes effective to close contacts 114 and open contacts 115 immediately after the fractional part of an hour has been perforated, which contacts 114 remain closed during the time when control element 49 is controlling automatic punching of the labor cost in the four columns in the blank card 22 immediately to the right of the columns devoted to receiving the time spent by the employee in a particular operation or job.

The contacts 114 and the magnet 92 are in series across the current supply line 109, through the wires 108, 111, while the contacts 115 are connected in shunt across the terminals of the magnet 68 which, it will be recalled, controls step-by-step feed of the carriage 52. The contacts 36 controlling the punch magnet 37 are in series with said magnet 37 and the magnet 68 across the line 109. The perforating machine is provided with the usual contact roll 116 and reading devices 117 for the master card 21 which contact roll 116 is mounted in the housing 26 and over the reading devices 117. Said reading devices 117 may be of the form disclosed in the patent to Lee and Phillips hereinbefore mentioned.

Each reading device 117 is connected to the magnet 27 corresponding to the index point position in the master card 21 which said device is designed to read. The contact roll 116 is connected through a line 118 to the line 108 while the magnets 27 have a common connection through a wire 119 to the right side of the current supply line 109. Each brush 87 is connected to the wire joining the reading device 117 and magnet 27 corresponding to the index point position which the brush 87 reads in the control element 49. That is to say, the brush 87 associated with the "9" index point position in the control element 49 is connected to the wire joining the reading device 117 and magnet 27 corresponding to the "9" index point position in the master card 21. In Fig 8 the index point values of the various contacts, brushes, reading devices, and magnets are indicated in small numerals below or adjacent the element concerned.

The construction of the machine having been described in detail, its operation will now be explained.

It will be understood that the operator of the machine will be provided with a set of rate cards arranged like the card 49 (Fig. 7), each of said cards being for a different rate. Preliminary to operating the machine to punch the labor cost in the cards, the records or vouchers evidencing the time spent on the individual jobs or operations will be sorted together so that all the jobs having the same wage rate will be grouped together according to the employee's number or, in case different rates apply when working on different jobs, all concerned with the same rate will be worked upon together.

Before commencing perforating operations, the operator will select the appropriate rate card and with the carriage 52 in the position shown in Fig. 1 will slip said card into position between the arms 54, 55 of said carriage until the card is gripped by the gripping devices 56, 57 and held in contact with the table 50. A thumb lever 120 fixed to the left arm 55 of the carriage 52 will then be grasped and the carriage 52 moved to the right (Fig. 1) until the ends of brushes 87 underlie the first column on the left of the card 49 (Fig. 7), the relative position of the parts after this operation has been completed being shown in Fig. 7, from which it will be seen that the stops 77, 78 are in line with said brushes and the first column of the card. The upper half of the machine in Fig. 1 is now in readiness for the punching operation.

The operator will then place a suitable master card 21 on the card reading table 23 with the carriage 20 in the position shown in Fig. 1, said master card being arranged to enter certain data, such as the job number, for instance, automatically in the blank card 22 during the subsequent operations of the machine. The thumb lever 24 of the perforating mechanism may now be grasped and moved to the left whereupon the carriage 20 will be drawn to the right (Fig. 1) to a position with the reading devices 117 cooperating with the first column of the master card 21 in which position (Fig. 3) a blank card 22 fed from the magazine 23 will be engaged by the carriage, the punches 25 overlying the first column of the card 22. The entire machine is now in readiness for the punching operations.

The required data, such as the employee's number and any other desired information, may now be entered by means of the keys in the usual fashion, the manual control of the keys being supplemented by automatic control of the card 21 in the desired fields until the columns are reached in which it is desired to perforate the time spent by an employee on a particular job or operation. It will be assumed that the elapsed time is to be entered in the seventy-fifth and seventy-sixth columns of the blank record card 22 in which case the projection 113 of the carriage 20 will be set to close the contacts 110 when the carriage is in a position to perforate in the seventy-fifth column.

Assuming that the time the operator spent was 3½ hours and his rate is 90 cents per hour, the operator will first depress the "3" key. This operation, in addition to causing the "3" punch to operate in the seventy-fifth column of the blank card 22, will also effect closure of the contacts 106, 107 associated with the "3" key, thereby completing a circuit through the magnet 80 and contacts 110, thus causing the fourth stop 77 from the bottom (Fig. 7) to become pushed downwardly into the path of the fourth step 75 in the plate 74. At the same time, the bail 102 will be depressed thereby releasing the dog 59 from engagement with the teeth 58 in the rack 53 so that the carriage 52 will become released and will move to the left (Fig. 7) until the operated stop 77 from the bottom is struck by the fourth step 75, thereby arresting the carriage. The operation of punching the "3" in the blank record 22 will cause the carriage 20 to escape as usual one column space thereby causing the contacts 110 to reopen and contacts 112 to close, thus deenergizing the magnet 80 which was previously operated, permitting the dog 59 to drop into engagement with the tooth 58 in rack 53, thus holding the carriage 52 for the time being. The operator will next depress the "2" key which also corresponds with the fraction ½ and the same cycle of operations will take place as before; however, the second stop 78 from the bottom (Fig. 7) will now become depressed owing to energization of associated magnet 81 through a circuit established from the wire 108, contacts 107 associated with the "2" key, the magnet 81 indicated by the numeral ½ in Fig. 8, contacts 112 now closed, and line 111, to the other side of the current supply line 109. The bail 102 will be depressed as before to release the dog 59 whereupon the carriage 52 will move a further distance to the left (Fig. 7) until the second or middle step of the fourth group of steps 76, counting from the left (Fig. 7), strikes the depressed stop 78. As a consequence the carriage will be arrested with the brushes 87 in registration with the first column in the field of the card 49 headed "3½".

The operation of the "2" key, besides causing the movement of carriage 52 just described, will also cause a perforation to be made in the "2" index point position of the seventy-sixth column in the blank record 22, the first four index point positions in this column being designed to represent the numerators of the fractions in a well-known manner, and, of course, the carriage will escape a further column space thereby opening contacts 112 and 115 and closing contacts 114. Opening of the contacts 115 will remove the shunt on the magnet 68 and at the same time closure of contacts 114 will connect the magnet 92 across the line wires 111 and 108 thereby energizing said magnet and causing the brushes 87 to be moved upwardly in the manner previously described until said brushes press against the underside of the control element 49.

The first column of the field headed "3½" of the control element 49 will have a "3" perforation since the product of 3½ times 90 cents is $3.15. As soon as the brushes 87 engage the card 49, the brush 87 reading the "3" index point position in said card will establish a circuit from line 119, the magnet 27 associated with the "3" index point position, the connecting line between said magnet and the card reading device 117 in the "3" index point position, brush 87 in the "3" index point position of the card 49, and line 108 to the left side of the current supply line 109.

Magnet 27 will thus operate the "3" key 29 as if said key had been depressed manually; consequently, a perforation will be made in the manner described hereinbefore in the "3" index point position of the seventy-seventh column of the card 22.

As soon as the contacts 36 close, due to operation of the interposer 32 associated with the "3" index point position, both the magnets 37 and 68 will be operated; consequently, the carriage 52 as well as the carriage 20 will be fed one column space to the left due to the operation of both escapement mechanisms in the manner previously described.

Movement of carriage 52 as just described, will cause the brushes 87 to read the "1" perforation in the second column of the field headed "3½" in the card 49 and the previously described cycle of operations will be repeated to cause the making of a perforation in the "1" index point position of the seventy-eighth column of the blank card 22. Two ensuing cycles of a similar nature will cause a perforation to be made in the "5" and "0" index point positions respectively of the seventh-ninth and eightieth columns of the card 22 and the machine will stop with the carriage 20 in the position shown in Fig. 1.

The card 22 which was perforated by the foregoing series of operations may now be readily removed and the thumb levers 24 and 120 operated to feed both carriages to the right in readiness for perforating another card.

It will be seen from the foregoing description that by means of the mechanism and the procedure just described, a batch of cards may be perforated in which each card represents the labor cost of a particular operation or job. After the cards have been perforated in this fashion they may be sorted in a well known type of sorting machine according to the employee's number, for instance, and subsequently fed through an electrical tabulating machine equipped with group control to secure a printed schedule which may be used for payroll purposes as it will show the total wages due to each individual workman.

The cards may also be sorted according to job number and run through the tabulating machine to secure a printed schedule showing the labor cost of each job.

It is clear that through the entry of the time spent in a particular job or operation the machine responds to automatically perforate in the appropriate columns of the record card the cost of the labor required for that particular operation or job without requiring the use of additional machines, such as calculating machines, for determining the product of the rate and time. Thus considerable time may be saved in the operation of making up cost records since it is quite possible to pre-punch cards for each rate which may be involved in manufacturing operations, which rate cards may be kept in numerical order in a suitable file within easy reach of the operator.

It will be clearly understood that it is not necessary to control the selective movements of the carriage 52 solely by means of the keys since the machine may as well be controlled automatically through a master card 21 which already has perforated therein the time spent on a particular job or operation. The only difference will be that a magnet 27 will operate the key 29 through the reading devices 117 reading the time perforated in the master card 21; therefore it is not desired to be limited to either manual or automatic operation as it is entirely optional as to which may be used. When the machine is operating through control by a master card 21 it is necessary that the columns in the master card corresponding to those in the blank card 22 receiving the cost perforations must be unperforated otherwise cross circuits would be established through the reading devices 117 when the carriage 20 is being fed through the columns devoted to receiving the cost perforations.

It will be understood that the machine is not limited to the use of a control element arranged like the one shown in Fig. 7 as, of course, the control element may be arranged in any desired manner; for instance, in order to increase the capacity of the card 49 it might be made larger or divided into fields of only three columns each in which case it would be possible to provide twenty-six fields thereby permitting a wider choice. If desired, the stepped plate 74 may be made removable and a different plate provided for each card setup so that a greater or a lesser number of fields may be provided in the control element 49. Various other modifications will, of course, readily suggest themselves to those skilled in the art.

As is usual in machines of this character there are provided certain safety contacts 121, 122, 123, the function of which is to insure correct operation of the machine and prevent establishing undesirable circuits. Contacts 121, for instance, are the usual left hand feed lever contacts or column cut-out contacts as they are often called. These contacts 121 are always opened whenever the left hand feed lever 124 (Fig. 1) is operated and open the circuit through the reading devices 117 and contact roll 116 when it is desired to feed the carriage to the right without feeding a blank card 22 from the magazine 23 as is the case when it is desired to place a blank card in the machine manually by inserting it when the carriage is in the position shown in Fig. 1. Contacts 121 are also opened by an adjustable slider mounted in the carriage (not shown) which prevents automatic duplicating operations under control of the master card 21 after a certain column has been reached, depending upon the setting of the slider.

The contacts 122 are opened whenever the feed lever 24 is operated to feed the carriage 20 to the right (Fig. 1) and also to feed a blank card 22 from the magazine. The contacts 123 are designed to open when the last column of the card has been perforated in order to prevent further punching operations until the carriage has been returned to its starting point with a new blank card therein. The foregoing contacts are fully described in the patent to Lee and Phillips referred to hereinbefore and are mentioned solely for sake of completeness.

The machine, if desired, can be embodied in machines of types other than the one shown, as for instance, it might be used to control a typewriting machine wherein the control element 49 is coordinated with the keys of the typewriter and the feeding mechanism for the master card 21 is coordinated with the carriage feeding mechanism of the typewriter.

The invention has been described as embodied in a specific form in a well known type of machine; however, it will be understood that the invention is not limited in its application to the specific form of embodiment or machine illustrated and described as various modifications or changes may be made in its form and it may be embodied in other types of machine as well.

I claim:

1. In combination, recording mechanism, selecting devices for controlling said mechanism, a control element adapted to control said mechanism and provided with a plurality of groups of data designations each group adapted to control the recording mechanism differently from the other groups, a carriage for said control element, and means controlled by the selecting devices for operating the carriage to select one of said groups to control the recording mechanism in accordance with the data designations in said group.

2. In combination, perforating mechanism, a series of keys for selectively controlling the perforating mechanism, a single control element adapted to be differentially selectively operated to control the perforating mechanism in accordance with one of a plurality of groups of data designations in said element, and means controlled by the keys for differentially selectively operating the control element to control the perforating mechanism in accordance with one of said groups of designations.

3. In combination, a master record, a control element differentially movable and having a plurality of groups of control designations, each group being different from the others, perforating mechanism adapted to be jointly controlled by both said record and said element, and means controlled by the master record for differentially actuating said control element to determine which group of designations in the control element is to effect operation of the perforating mechanism.

4. In combination, recording mechanism, a series of keys for directly controlling said recording mechanism to record an item; a control device for said mechanism including a control element having groups of data designations each group adapted to control the recording mechanism in accordance with the designations in said group, and means also controlled by the keys for selectively calling into action one of said groups according to the item recorded whereby to subsequently control the recording mechanism in accordance with the data designations in the group called into action.

5. In combination, perforating mechanism, a support for a control record, said record having a plurality of fields or subareas each provided with data designating means, means connected with the perforating mechanism and adapted to read said designations whereby to control said mechanism accordingly, feeding means for causing a relative movement between the support and the reading means to permit the latter to read data designations in one of the subareas of said record, and means for selectively controlling the feeding means to render the reading means effective to read one of said subareas and control the perforating mechanism accordingly.

6. In combination, perforating mechanism, a master record, means controlled by the master record for selectively actuating the perforating mechanism in accordance with data designations in the master record, a control element divided into subareas or portions each having a group of data designations different from the data designations in other subareas of said element; and means controlled by the master record for selectively operating the control element to control the perforating mechanism in accordance with the data designations in one of said subareas or portions.

7. In combination, recording mechanism, selecting mechanism for controlling operation of the recording mechanism; a control device for operating the recording mechanism including a statistical record card of conventional shape having a plurality of groups of data designations, each group representing different data, and means controlled by the selecting mechanism for differentially operating the record card whereby to render one of said groups of designations effective to operate the recording mechanism.

8. In combination, perforating mechanism, a control element adapted to control said mechanism and provided with data designating means for exercising such control, a support for said element, means connected to said mechanism for sensing said designating means, a series of keys for controlling the perforating mechanism and means controlled by said keys for differentially moving the support and sensing means relative to each other whereby to render the sensing means effective to control the perforating mechanism in accordance with a part only of the data designating means.

9. In a reproducing machine, perforating mechanism, a pair of master records for controlling said mechanism, and means controlled by one of said records for differentially selectively operating the other record to control the recording mechanism in accordance with a part only of the other record.

10. In a reproducing machine, a control member having a plurality of different groups of data designating means, an analyzer for sensing said designating means, a recording device adapted to be selectively actuated by the analyzer in accordance with said designating means, a master record, means controlled by a predetermined part of the master record for effecting a preliminary selecting movement of the control member and analyzer relative to each other to select one of said groups of data designating means for analysis and means for effecting a further relative movement between the control member and analyzer to analyze the designating means in the group selected by said preliminary movement and control the recording device in accordance with the designating means in the group selected for analysis.

11. In a reproducing machine, perforating mechanism; a pair of master records for controlling said mechanism, one of said records having designations representing a predetermined factor and controlling the perforating mechanism accordingly, the other of said records having a plurality of fields, each field in the second record having designations bearing a predetermined relation to a given factor, one of which factors may correspond to the predetermined factor designated in the first named record and adapted to control the perforating mechanism, and means controlled by the designations in the first named record for calling into action to control the perforating mechanism the designations in the field of the second named record corresponding to the factor designated in the first named record.

12. In a reproducing machine, recording devices, a control record having a plurality of groups of data designating means adapted to control the recording devices, each group having a predetermined relation to a given factor, an analyzer adapted to sense said designations and control the recording devices in accordance with said designations, a second control record wherein may appear designations corresponding to one of the first named factors, an analyzer for sensing the designations in the second record, and means controlled by the designations in the second record and through the last named analyzer for bringing the first named analyzer into position to analyze the group of designations in the first record corresponding to the factor represented by the designations in the second record.

13. In combination, recording mechanism, selecting devices for directly controlling the recording mechanism to record items, a control device including a movable control element having groups of data designations adapted to control the selecting devices to record data represented by said groups of designations, analyzing means connected to the selecting devices for reading the designations in the control element, and means controlled by the selecting devices for initially selectively moving the control element relative to the analyzing means to render the latter effective to read a selected one of said groups of designations.

14. In combination, recording mechanism, a series of manipulative elements for directly operating the recording mechanism to record data, a single control element adapted to be differentially selectively operated to control the recording mechanism in accordance with a selected one of a plurality of groups of data designating means in said element, and means also controlled by said manipulative elements for differentially selectively operating the control element to control the recording mechanism in accordance with the group selected by operation of the manipulative elements.

15. In combination, recording mechanism, means for directly controlling the operation of the recording mechanism to record items, a control element adapted to control the recording mechanism and having groups of data designations representing predetermined data, and means also controlled by the first named means for selectively operating the control element to render only one of said groups effective to control the recording mechanism.

16. In a reproducing machine, recording mechanism; a pair of master records for controlling said machine, one of said records comprising a conventional Hollerith record card perforated in accordance with arbitrary data among which may occur a significant factor, the other record also comprising a conventional Hollerith record card divided into a plurality of fields corresponding to predetermined factors and perforated with data having direct relationship to the predetermined factors; means for sensing the presence in the first record of the data representing the significant factor, means controlled by the sensing means for operating the second record to select the field corresponding to the significant factor, and means for sensing the designations in the selected field and controlling the recording mechanism in accordance with such designations.

17. In combination, recording mechanism, a master record adapted to control the recording mechanism; a differentially operable control element also adapted to control the recording mechanism and having a plurality of groups of control designations, each group being different from the others; and means controlled by the master record while it is controlling the recording mechanism for differentially operating the control element whereby to select for controlling the recording mechanism one of said groups of designations.

18. In combination, recording mechanism, a pair of master records for controlling said mechanism, one of said records having designations representing a predetermined factor which may comprise several significant digits each represented by at least one designation, the other of said records having a plurality of groups of data designations corresponding to predetermined factors one of which may be the predetermined factor, an analyzer connected to the recording mechanism for sensing the designations in the last named record, and means controlled by the designations in the first record representing the predetermined factor for selectively moving the second record and analyzing means relative to each other in one or more steps of movement according to the number and value of the significant digits in the predetermined factor whereby to select for controlling the recording mechanism the group of designations in the second record which correspond to the predetermined factor.

19. In combination, recording mechanism, a series of manually operated devices for controlling item entering operations of the recording mechanism; a master record having a plurality of groups of data designations, said groups bearing definite relations to predetermined factors entered as items under control of said devices, which factors may comprise more than one digit; analyzing means connected to the recording mechanism for sensing said designations and controlling the recording mechanism in accordance with said designations, and means controlled by the manually operated devices for selectively moving the analyzing means and master record relative to each other in one or more steps of selecting movement according to the number and value of the digits in the item entered under control of said manually operated devices whereby to select for controlling the recording mechanism the group of designations corresponding to the factor entered under control of the manually operated devices.

20. In a machine of the class described, a series of digit keys which may be selectively operated in accordance with factors comprising more than one digit, a movable record carriage, and means controlled by said keys for differentially moving the carriage a distance proportional to the value of a factor comprising a plurality of digits.

21. In a machine of the class described, a master record, said master record having designations representing a factor which may comprise more than one digit, analyzing means for sensing the designations in the master record, a movable carriage, and means controlled by the analyzing means for differentially moving the carriage a distance proportional to the value of the factor represented by the designations in the master record.

JOHN P. MARTIN.